(12) United States Patent
Olsson

(10) Patent No.: US 9,527,615 B2
(45) Date of Patent: Dec. 27, 2016

(54) METHOD OF PRODUCING A PACKAGING MATERIAL FOR A RETORTABLE PACKAGE

(75) Inventor: Åsa Olsson, Höör (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 26 days.

(21) Appl. No.: 13/876,333

(22) PCT Filed: Aug. 5, 2011

(86) PCT No.: PCT/SE2011/050978
§ 371 (c)(1),
(2), (4) Date: Mar. 27, 2013

(87) PCT Pub. No.: WO2012/044229
PCT Pub. Date: Apr. 5, 2012

(65) Prior Publication Data
US 2013/0192166 A1    Aug. 1, 2013

(30) Foreign Application Priority Data
Sep. 28, 2010   (SE) ...................................... 1000964

(51) Int. Cl.
| B32B 27/32 | (2006.01) |
| B65B 7/00 | (2006.01) |
| D21H 19/36 | (2006.01) |
| D21H 19/82 | (2006.01) |
| D21H 27/10 | (2006.01) |
| D21H 27/30 | (2006.01) |

(Continued)

(52) U.S. Cl.
CPC ................ B65B 7/00 (2013.01); B32B 15/12 (2013.01); B32B 15/20 (2013.01); B32B 27/10 (2013.01);

(Continued)

(58) Field of Classification Search
CPC .......... B32B 27/10; B32B 15/12; B32B 15/20; B32B 2255/12; B32B 2307/31; B32B 2307/4023; B32B 2307/412; B32B 2307/7242; B32B 2307/75; B32B 2439/00; B32B 2439/70; Y10T 428/1303

(Continued)

(56) References Cited

U.S. PATENT DOCUMENTS 4,126,595 A * 11/1978 Martorano et al. ........... 524/512
6,117,935 A *  9/2000 Schofield et al. ............. 524/555

(Continued)

FOREIGN PATENT DOCUMENTS

| DE | 102 52 553 A1 | 6/2004 |
| JP | 2002-54091 A | 2/2002 |

(Continued)

OTHER PUBLICATIONS

International Search Report (PCT/ISA/210) issued on Dec. 21, 2011, by the Swedish Patent Office as the International Searching Authority for International Application No. PCT/SE2011/050978.

*Primary Examiner* — Marc A Patterson
(74) *Attorney, Agent, or Firm* — Buchanan Ingersoll & Rooney PC

(57) ABSTRACT

A packaging material for a retortable package provided with decorative artwork includes a paper layer and outer, heat-resistant plastic coatings. In order to improve the printability of the paper layer, the surface of the paper layer intended for printing is coated with a composition of pigment, adhesive or binder and a substance possessing the capability of modifying the rheological properties of the coating.

5 Claims, 2 Drawing Sheets

Figure 1C:
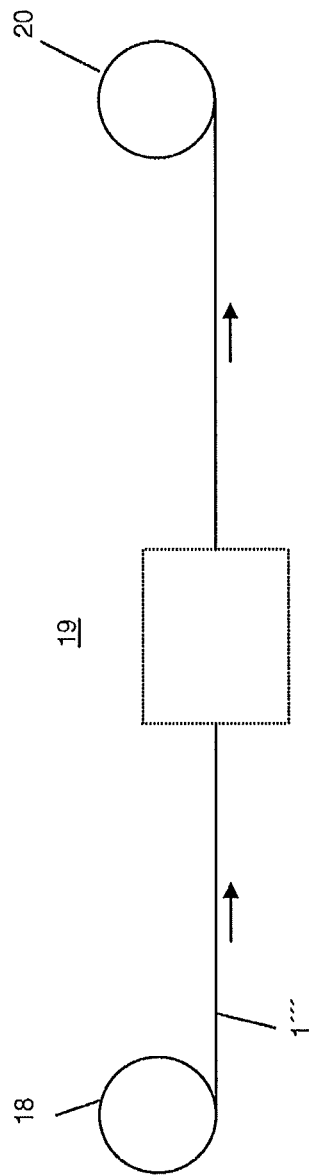

(51) Int. Cl.
   *B32B 15/12*   (2006.01)
   *B32B 15/20*   (2006.01)
   *B32B 27/10*   (2006.01)
   *B32B 1/08*   (2006.01)
   *B65B 3/02*   (2006.01)
   *B65B 9/10*   (2006.01)

(52) U.S. Cl.
   CPC .............. *D21H 19/36* (2013.01); *D21H 19/82* (2013.01); *D21H 27/10* (2013.01); *D21H 27/30* (2013.01); *B32B 2255/12* (2013.01); *B32B 2307/31* (2013.01); *B32B 2307/4023* (2013.01); *B32B 2307/412* (2013.01); *B32B 2307/7242* (2013.01); *B32B 2307/75* (2013.01); *B32B 2439/00* (2013.01); *B32B 2439/70* (2013.01); *B65B 3/025* (2013.01); *B65B 9/10* (2013.01)

(58) Field of Classification Search
   USPC ................... 428/34.1, 34.2, 35.7, 35.9, 36.9
   See application file for complete search history.

(56) References Cited

U.S. PATENT DOCUMENTS

| | | | |
|---|---|---|---|
| 6,397,497 B1 * | 6/2002 | McAtee | A43B 3/0078 36/136 |
| 6,852,422 B2 * | 2/2005 | Kendall et al. | 428/511 |
| 7,731,820 B2 | 6/2010 | Cockcroft et al. | |
| 8,530,563 B2 | 9/2013 | Evstatieva et al. | |
| 8,816,037 B2 * | 8/2014 | Burckhardt | 528/77 |
| 8,859,661 B2 * | 10/2014 | Attal | 524/422 |
| 2004/0170781 A1 | 9/2004 | Sickert et al. | |
| 2004/0241475 A1 * | 12/2004 | Morabito | B32B 27/10 428/507 |
| 2005/0089651 A1 * | 4/2005 | Okomori | D21H 19/36 428/32.34 |
| 2007/0298196 A1 * | 12/2007 | Petersen et al. | 428/34.2 |
| 2008/0073617 A1 | 3/2008 | Cockcroft et al. | |
| 2009/0298996 A1 * | 12/2009 | Ghosh | C08F 220/06 524/555 |
| 2010/0062274 A1 | 3/2010 | Leth | |

FOREIGN PATENT DOCUMENTS

| | | | |
|---|---|---|---|
| JP | 2003-336189 A | | 11/2003 |
| JP | 2004-17984 A | | 1/2004 |
| JP | 2004-42960 A | | 2/2004 |
| JP | 2006308529 A | * | 11/2006 |
| JP | 2009-161888 A | | 7/2009 |
| WO | WO 00/76862 A1 | | 12/2000 |
| WO | WO 2006/045714 A1 | | 5/2006 |
| WO | WO 2008/094085 A1 | | 8/2008 |
| WO | WO-2010042162 | * | 4/2010 |
| WO | 2010-060863 A1 | | 6/2010 |
| WO | WO 2010/114467 A1 | | 10/2010 |

* cited by examiner

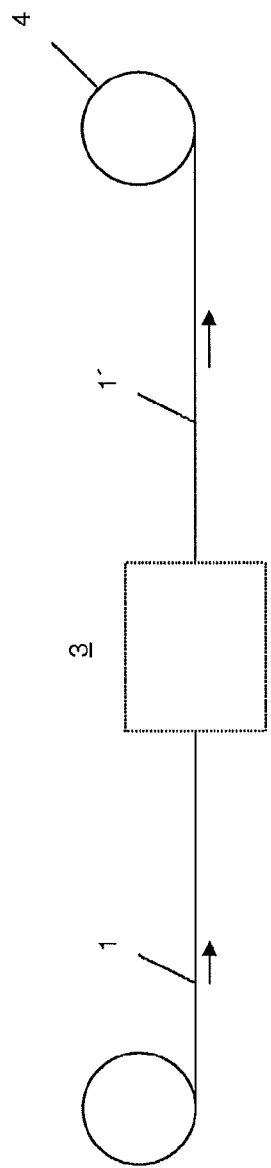
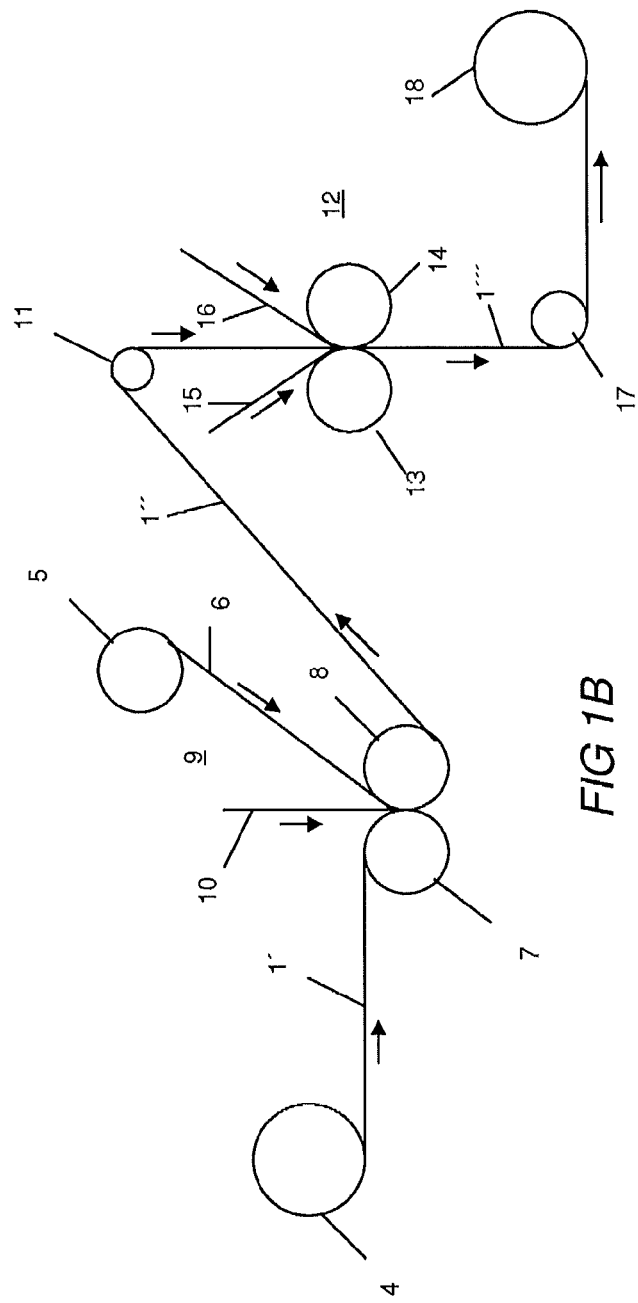
FIG 1A
FIG 1B

METHOD OF PRODUCING A PACKAGING MATERIAL FOR A RETORTABLE PACKAGE

TECHNICAL FIELD

The present invention relates to a method of producing a packaging material provided with decorative artwork for a package of the type which, after filling and sealing, is intended, for purposes of extending shelf-life, to be subjected to a heat treatment at elevated temperature in an atmosphere of high relative humidity, the method comprising the steps of providing a web of paper whose one surface has a printable coating of pigment and adhesive, providing the printable coating with optional decorative artwork of printing ink, and coating the web provided with decorative artwork with outer, heat-resistant coatings of plastic on both sides of the web.

The present invention also relates to a packaging material for a package of the type which, after filling and sealing is, for purposes of extending shelf-life, intended to be subjected to a heat treatment at elevated temperature in an atmosphere of high relative humidity, the packaging material comprising a layer of paper whose one surface has a printable coating of pigment and adhesive, and decorative artwork of printing ink applied on the printable coating, as well as a recurring pattern of crease lines in register with said decorative artwork of printing ink.

The present invention moreover relates to a package produced by fold forming and thermosealing of the packaging material, the package being of the type which, after filling and sealing, is intended to be subjected, for purposes of extending shelf-life, to a heat treatment at elevated temperature in an atmosphere of high relative humidity.

BACKGROUND ART

Within packaging technology, use is often made of packages of a single-use disposable nature for packing and transporting foods. One very large group of these single-use disposable packages is produced from a packaging material comprising a layer of paperboard and outer, liquid-tight coatings of plastic. In order to impart to the packaging material superior tightness properties vis-à-vis gases, in particular oxygen gas, the packaging material is supplemented with at least one additional layer of a material possessing such tightness properties, normally an aluminium foil (Alifoil).

From the prior art packaging material, packages are produced using modern packing and filling machines which, from a web or from prefabricated blanks of the packaging material, both form, fill and seal finished packages.

From, for example, a web, packages are produced in that the web is first reformed into a tube by both longitudinal edges of the web being folded towards and united to one another in a mechanically strong and liquid-tight sealing joint ("overlap joint"). The tube is filled with an optional food and is divided into cushion-shaped packaging units by repeated transverse sealing of the tube transversely of the longitudinal axis of the tube and beneath the filling level of the tube. The packaging units are separated from one another by incisions in the transverse sealing zones and are given the desired geometric outer configuration, normally parallelepipedic, by an additional fold forming and thermosealing operation.

Correspondingly, packages are produced from flat-folded tubular blanks of the packaging material. The flat-folded blank is raised to an open packaging carton whose one end (e.g. the bottom end) is sealed by fold forming and thermosealing of the continuous foldable bottom panels of the packaging carton. The packaging carton thus provided with a bottom is filled with optional food, whereafter the open end of the packaging carton (in this example the top end) is sealed by fold forming and thermosealing of the corresponding foldable top panels of the packaging carton.

On the market today, there occur such packages of a single-use disposable nature in an almost insurmountably large multiplicity of packaging variations for an almost equally insurmountably large multiplicity of foods, from liquid to solid and semi-solid foods.

One large group of commercial single-use disposable packages comprises so-called aseptic packages in which a previously sterilized food is packed in a similarly previously sterilized package under aseptic conditions. The aseptic package distinguishes itself in that the food may be stored in the package for up to months and even longer at ambient temperature, without the food deteriorating or being ruined.

Another group of prior art single-use disposable packages comprises packages in which the food must, throughout its entire storage time in the package, be kept refrigerated (at most approx. +8° C.) in order not to deteriorate or be completely ruined before its "best before date".

A further group of such single-use disposable packages comprises so-called retortable packages which are intended to be filled with food and, after sealing, be subjected to a heat treatment for the purposes of extending shelf-life at elevated temperature in an atmosphere of high relative humidity. Like the aseptic packages, the retortable packages have the capability of being able to store the packed food for several months and even longer at ambient temperature without the food deteriorating or being ruined before its "best before date".

A packaging material of the type described by way of introduction is produced in a per se known manner in that a web of paper is unwound from a magazine reel. The web is led to a printing station where the one side of the web is provided with optional decorative artwork of printing ink and, at the same time, is provided with a corresponding pattern of crease lines in register with the decorative artwork.

Since paper generally displays an extremely coarse and uneven surface characteristic which impairs the printability of the paper surface, and thereby makes it difficult to ensure a good and even quality of decorative artwork, the paper surface is right from the outset provided with a smooth coating which improves printability. Examples of such printability-improving coatings are well-known to a person skilled in the art and in general consist of a combination of pigment and adhesive.

The web provided with decorative artwork and crease lines is led further to a lamination station where both sides of the web are provided with outer, liquid-tight coatings of plastic by extrusion. One typical example of a prior art such extruded coating is polyethylene.

If the packaging material is intended for a package for particularly oxygen gas-sensitive foods, such as juice, wine or cooking oil, the web is moreover provided with a layer serving as oxygen gas barrier, normally an aluminium foil, which is laminated to the web between the paper layer of the web and one of the two outer, liquid-tight coatings.

The laminated web is led further to one or more mechanical processing stations where the web is cut into suitable dimensions and detected faults on the web are removed, before the web is finally wound up into finished, customer-adapted transport reels.

In the prior art method, packaging material is produced for both aseptic packages and for packages in which a packed food must be kept refrigerated throughout its entire storage life up to the moment of consumption ("best before date"). On the other hand, attempts by such means to produce a packaging material for so-called retortable packages have largely failed. One serious drawback which has been observed in connection with a package of the packaging material being subjected to a heat treatment at elevated temperature in an atmosphere of high relative humidity (such as in a steam retort) is that the decorative artwork of the package becomes seriously damaged under these conditions and has thereby rendered the appearance of the package unsightly and unattractive. Not only have cracks and crack formation related to humidity and heat in the decorative artwork carrying coating of the packaging material been noted, but also the mechanical firmness and stability of the package has seriously deteriorated and rendered the package sloppy and difficult to handle. These problems are further aggravated in those cases when the retortable package, during the heat treatment for extending shelf-life is at the same time subjected to high pressure in a retort.

There is thus a need in the art to modify, in a simple manner and by simple means, the method described by way of introduction to such an extent that it may also be employed for producing packaging material for retortable packages without accompanying problems of the type described above. One particular need is to be able to utilise the excess capacity which exists in already established production plants for producing packaging material also for retortable packages, without overly excessive and costly modifications being necessary to these plants.

OBJECTS OF THE INVENTION

One object of the present invention is therefore to satisfy the above-described needs in the art.

A further object of the present invention is to realise a method of the type described by way of introduction which also makes for the production of a well-functioning packaging material for a package of the type which, after filling and sealing, is, for purposes of extending shelf-life, intended to be subjected to a heat treatment at elevated temperature in an atmosphere of high relative humidity.

One particular object of the present invention is to realise a method of the type described by way of introduction which also makes for the production of a well-functioning packaging material for a package of the type which, after filling and sealing, is, for purposes of extending shelf-life, intended to be subjected to a heat treatment at elevated temperature and high pressure in an atmosphere of high relative humidity.

Yet a further object of the present invention is to realise a packaging material provided with decorative artwork for a retortable package, the packaging material comprising a layer of paper or paperboard whose one surface has a printability-improving coating of pigment on which is printed optional decorative artwork of printing ink, as well as outer, thermosealable heat-resistant coatings of plastic, without accompanying problems and drawbacks of the type which are associated with the prior art packaging material.

Still a further object of the present invention is to realise a package produced by fold forming and thermosealing of the packaging material according to the present invention which may be subjected to heat treatment at elevated temperature in an atmosphere of high relative humidity, without accompanying problems of the type which occur in the prior art technology.

Still a further object of the present invention is to realise a package produced by fold forming and thermosealing of the packaging material according to the present invention which may be subjected to a heat treatment at elevated temperature and high pressure in an atmosphere of high relative humidity, without accompanying problems of the type which occur in the prior art technology.

BRIEF OUTLINE OF THE INVENTION

According to one aspect of the present invention, there will thus be realised a method of producing a packaging material provided with decorative artwork for a package of the type which, after filling and sealing, is intended, for purposes of extending shelf-life, to be subjected to a heat treatment at elevated temperature, preferably also high pressure, in an atmosphere of high relative humidity, the method comprising the steps of providing a web of paper whose one surface has a printable coating of pigment and adhesive or binder, providing the printable coating with optional decorative artwork of printing ink, and coating the web provided with decorative artwork with outer, heat-resistant coatings of plastic on both sides of the web. The method according to the present invention is characterised in that the printable coating also includes a substance possessing the capability of modifying the rheological properties of the coating ("rheology modifier").

By but a simple modification of the printable coating on the one surface of the paper web, it has thus surprisingly proved to be possible to produce a well-functioning packaging material for a retortable package in the same manner and using the same production equipment as for corresponding packaging materials for the above-mentioned other groups of packages. In other words, the method according to the present invention makes possible an efficient utilization of excess capacity in already existing factories and production plants solely by a simple modification of the prior art method described by way of introduction.

In one practical embodiment of the method according to the present invention, the web provided with decorative artwork is provided with a pattern of crease lines in register with the decorative artwork in order to facilitate fold forming of the packaging material when this, in a per se known manner, is to be reformed into packages.

In a further practical embodiment of the method according to the present invention, the web provided with decorative artwork and crease lines is supplemented with at least one additional layer of a material possessing superior tightness properties vis-à-vis gases, in particular oxygen gas. Examples of such oxygen gas-tight materials may be ethylene vinyl alcohol copolymers (EVOH) and polyamide (PA), but preferably use is made of an aluminium foil, Alifoil, which is laminated to the web between the paper or paperboard layer and one of the two outer coatings of plastic. An aluminium foil affords the advantage that it renders the packaging material thermosealable by induction heating, which is a rapid, reliable and efficient sealing technology on reforming of the packaging material into finished packages.

According to one preferred embodiment of the method according to the invention, the surface of the paperboard web intended for printing is coated with a printability-improving coating composition containing: a binder which is selected from the group essentially comprising styrene butadiene latex, methyl methacrylate butadiene latex, polyacrylate latex, styrene acrylic latex, polyvinyl acetate, polyvinyl alcohol, polysaccharides, starch, protein and combinations thereof; a rheology modifier which is selected from the group essentially comprising protein, polysaccharides, carboxy methyl cellulose (CMC), hydroxyl ethyl cellulose (HEC), alkali soluble acrylic polymer emulsion (ASE), hydrophobically modified alkyl soluble acrylic polymer (HASE), polyurethane (PU), polyvinyl alcohol (PVOH) and starch; and pigment which is selected from the group essentially comprising layered silicate mineral, hydratised magnesium silicate, calcium carbonate, titanium dioxide and kaolin.

In one preferred embodiment of the method according to the present invention, at least 50% of the pigment of the coating composition consists of calcium carbonate, at the same time as both the adhesive and said rheology modifier consist of an acrylic copolymer.

In yet a further advantageous embodiment of the present invention, the composition serving as printable coating includes a binder or adhesive of a styrene acrylic copolymer in a quantity of 10-20%, counting on the weight of the composition, pigment of layered silicate mineral clay and calcium carbonate in an amount of 80-90%, counting on the weight of the composition, and a rheology modifier in an amount of 0.1-1%, counting on the weight of the composition.

According to another aspect of the present invention, there will be realised a packaging material for a retortable package, which comprises a layer of paper whose one surface has a printable coating of pigment and adhesive with decorative artwork of printing ink applied on the coating, as well as outer, heat-resistant coatings of plastic. The packaging material is characterised in that the printable coating also includes a substance capable of modifying the rheological properties of the coating ("rheology modifier").

According to the present invention, it has surprisingly been observed that a package produced from the packaging material according to the present invention which has been filled with food and thereafter sealed may very well be subjected to a heat treatment for purposes of extending its shelf-life in a retort, without the package being damaged or destroyed. In particular, it has proved that a package produced by fold forming and thermosealing of the packaging material according to the present invention withstands such a heat treatment at elevated temperature and relative humidity under high pressure, without the decorative artwork or mechanical firmness and dimensional stability of the package deteriorating because of the very severe action of humidity and heat. On a visual inspection of heat treated packages, neither moisture- nor heat-related cracks or crack formations in the coating of the packaging material carrying the decorative artwork have been observed, but both the package and the packaging material in the heat treated package were practically totally unaffected and intact after the severe heat treatment.

In order to avoid unnecessary misunderstanding, it should be observed that the expression "rheology modifier" as this is employed in the present invention is taken to signify a substance capable of modifying the rheological properties of the printable coating to such an extent that the packaging material provided with the decorative artwork is sufficiently resistant to moisture and heat so as not to be destroyed during the heat treatment. Moreover, it should be observed that the expression "paper" is also intended to encompass paper qualities of the type such as paperboard and similar rigid, but foldable paper qualities.

In one preferred embodiment of the packaging material according to the present invention, the printable coating composition includes an adhesive selected from the group essentially comprising styrene butadiene latex, methyl methacrylate butadiene latex, polyacrylate latex, styrene acrylic latex, polyvinyl acetate, polyvinyl alcohol, polysaccharides, starch, protein and combinations thereof; a rheology modifier selected from the group essentially comprising protein, polysaccharides, CMC, HEC, ASE, HASE, PU, PVOH and starch; and pigment selected from the group essentially comprising layered silicate mineral, hydratised magnesium silicate, calcium carbonate, titanium dioxide and kaolin.

In one practical embodiment of the packaging material according to the present invention, at least 50% of the pigment in the printable coating is calcium carbonate, in addition to which both the adhesive and said rheology modifier include an acrylic copolymer.

In particular, the printable coating in the packaging material according to the present invention may contain: an adhesive of a styrene acrylate copolymer in an amount of 10-20%, counting on the weight of the composition; pigment of layered silicate mineral clay and calcium carbonate in an amount of 80-90%, counting on the weight of the composition; and a rheology modifier in an amount of 0.1-1%, counting on the weight of the composition.

In that case when the packaging material according to the present invention is to be reformed into a retortable package by fold forming and thermosealing, the packaging material may preferably be provided with a pattern of crease lines in register with the decorative artwork of the packaging material.

If the packaging material according to the present invention is intended for a retortable package for particularly oxygen gas-sensitive foods, the packaging material may, in yet a further advantageous embodiment, be provided with at least one layer which serves as oxygen gas barrier and which possesses the desirable tightness properties vis-à-vis oxygen gas. Examples of materials possessing such tightness properties may be so-called barrier polymers, such as for example ethylene vinyl alcohol copolymer (EVOH) and polyamide (PA). Preferably however, this layer consists of an aluminium foil which is laminated to the packaging material between the paper layer and one of the two outer heat-resistant coatings of plastic. An aluminium foil also affords the advantageous property that it renders the packaging material thermosealable by induction sealing which is a rapid, reliable and efficient sealing technology.

Practical examples of plastics which may be employed for the outer, heat-resistant coatings in the packaging material according to the present invention may be high density polyethylene (HDPE), linear low density polyethylene (LLDPE), polypropylene (PP) and polyester (PET).

According to yet a further aspect of the present invention, there will be realised a retortable package by fold forming and thermosealing of the packaging material according to the present invention.

BRIEF DESCRIPTION OF THE ACCOMPANYING DRAWINGS

Figure 3:
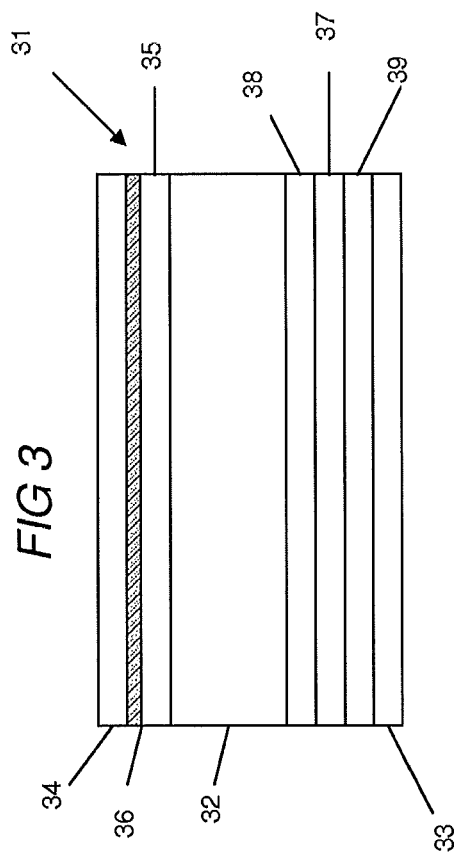
Figure 2:
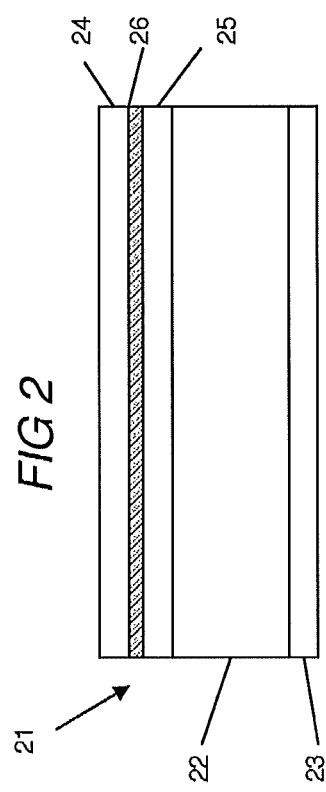

The present invention will now be described in greater detail hereinbelow, with reference to the accompanying Drawings. In the accompanying Drawings:

FIG. 1A-1C schematically illustrate a per se known method of producing a packaging material, FIG. 1A showing a first part of the method for various introductory mechanical processing operations; FIG. 1B shows a second part of the method for lamination operations, and FIG. 1C shows a third or finishing part of the method for further mechanical processing operations;

FIG. 2 schematically illustrates a cross section of a packaging material according to a first embodiment of the present invention; and FIG. 3 shows a schematic cross section of a packaging material according to a second embodiment of the present invention.

DESCRIPTION OF PREFERRED EMBODIMENTS AND DETAILED DESCRIPTION OF THE ACCOMPANYING DRAWINGS

Thus, FIGS. 1A-1C schematically illustrate a per se known method of producing a packaging material. The prior art method comprises, in the illustrated example, a first production line (FIG. 1A) for various introductory mechanical production processes, a second production line (FIG. 1B) for necessary coating- and lamination operations, and a third or finishing production line (FIG. 1C) for further mechanical processing operations.

In FIG. 1A, a web 1 of paper is unwound from a magazine reel 2 at the left-hand side of the figure. The web 1 is led in the direction of the arrow to a first processing station at 3 where the one surface of the web is provided with optional decorative artwork of printing ink by suitable printing technique, e.g. flexography, offset printing, lithography etc. Such printing techniques are well-known to a person skilled in the art and therefore require no further detailed description. At the same processing station 3, or in immediate association therewith, the web 1 is also provided with a pattern of crease lines which are applied on the web 1 in register with the decorative artwork of the web 1.

From the processing station 3, the web 1' thus provided with decorative artwork and crease lines is led further for winding up and intermediate storage on a storage reel 4 to the right in FIG. 1A.

The storage reel 4 is transferred to the second production line as shown in FIG. 1B. From the storage reel 4 to the left in the figure, the web 1' provided with decorative artwork and crease lines is unwound and led to and converged with an aluminium foil 6 unwound from a magazine reel 5 at the nip between two rotary rollers 7 and 8 at a lamination station 9. The web 1' and the aluminium foil 6 are led together through the nip at the same time as an adhesive or binder 10 is extruded between them through an extruder device (not shown).

From the lamination station 9, the laminated web 1" is led via a bending roller 11 to a coating station at 12 where the web 1" is led through the nip between two rotary rollers 13 and 14 at the same time as both sides of the web are coated with outer, heat-resistant films 15 and 16, respectively which, in the illustrated example, are extruded on the web by means of their respective extruder devices (not shown). From the coating station 12, the thus laminated coated web 1'" is led via one or more bending rollers 17 further for winding up and intermediate storage on a storage reel 18.

The storage reel 18 is transferred to the third production line as shown in FIG. 1C. From the storage reel 18, the web 1'" is unwound and led to one or more additional mechanical processing stations (schematically illustrated at 19) where the web 1'" is subjected to the necessary trimming, repair and fine tuning operations before the web 1'" is finally wound up on a finished, customer-adapted magazine reel 20.

In order to make possible production of a well-functioning, well-decorated packaging material in the manner described above, the side of the web intended for printing is, according to the present invention, provided with a printable coating which includes pigment, adhesive or binder and a substance possessing the capacity to modify the rheological properties of the coating ("rheology modifier").

According to the present invention, such a substance possessing the capability of modifying the rheological properties of the coating is selected from the group essentially comprising protein, polysaccharides, carboxy methyl cellulose (CMC), hydroxy ethyl cellulose (HEC), alkali soluble acrylic polymer emulsion (ASE), hydrophobically modified alkali soluble acrylic polymer (HASE), polyurethane (PU), polyvinyl alcohol (PVOH) and starch.

Examples of usable pigment for the printable coating may be selected from the group essentially comprising layered silicate mineral, hydratised magnesium silicate, calcium carbonate, titanium dioxide and kaolin, and examples of usable adhesive or binder for the same coating may be selected from the group essentially comprising styrene butadiene latex, methyl methacrylate-butadiene latex, polyacrylate latex, styrene acrylate latex, polyvinyl acetate, polyvinyl alcohol, polysaccharides, starch, protein or optional combinations thereof.

According to one specific embodiment, the printable coating may contain an adhesive or binder of a styrene acrylic copolymer in an amount of 10-20%; pigment of layered silicate mineral clay and calcium carbonate in an amount of 80-90%; and a rheology modifier in an amount of 0.1-1%, all percentage weight proportions being based on the total weight of the composition.

FIG. 2 is a schematic cross section of a retortable packaging material according to a first embodiment of the present invention. The packaging material, which has been given the generic reference numeral 21, has a rigid, but foldable core layer 22 of paper, as well as outer heat-resistant layers or coatings 23 and 24, respectively on both sides of the core layer 22.

In order to render the packaging material 21 printable so that, in a simple manner using prior art technology and prior art equipment, it may be printed with optional decorative artwork of printing ink, the side of the core layer 22 intended for printing in the packaging material 21 according to the present invention carries a printable coating 25 of pigment, adhesive or binder and a substance possessing the capability of modifying the rheological properties of the coating ("rheology modifier").

In order not to conceal the decorative artwork 26 of printing ink printed on the printable layer 25 of the core layer 22, the outer heat-resistant layer or coating 24 of the packaging material 24 should be transparent, so that the subjacent decorative artwork 26 will be clearly visible and apparent on visual inspection from the decorative side of the packaging material 21.

Usable materials for the heat-resistant transparent coating 24 may be selected from the group essentially comprising high density polyethylene (HDPE), linear low density polyethylene (LLDPE), polypropylene (PP) and polyester (PET).

Correspondingly, usable materials for the heat-resistant outer coating 23 on the other side of the packaging material 21 may also be selected from the group essentially comprising high density polyethylene (HDPE), linear low density polyethylene (LLDPE), polypropylene (PP) and polyester (PET).

Such a substance possessing the capability of modifying the rheological properties of the coating is selected according to the present invention from the group essentially comprising protein, polysaccharides, carboxy methyl cellulose (CMC), hydroxy ethyl cellulose (HEC), alkali soluble acrylic polymer emulsion (ASE), hydrophobically modified alkali soluble acrylic polymer (HASE), polyurethane (PU), polyvinyl alcohol (PVOH) and starch.

Examples of usable pigment for the printable coating 25 may be selected from the group essentially comprising layered silicate mineral, hydratised magnesium silicate, calcium carbonate, titanium dioxide and kaolin, and examples of usable adhesive or binder for the same coating may be selected from the group essentially comprising styrene butadiene latex, methyl methacrylate-butadiene latex, polyacrylate latex, styrene acrylate latex, polyvinyl acetate, polyvinyl alcohol, polysaccharides, starch, protein or optional combinations thereof.

In one specific embodiment, the printable coating may contain an adhesive or binder of a styrene acrylic copolymer in an amount of 10-20%; pigment of layered silicate mineral clay and calcium carbonate in an amount of 80-90%; and a rheology modifier in an amount of 0.1-1%, all percentage weight proportions being based on the total weight of the composition.

FIG. 3 is a schematic cross section of a retortable packaging material according to a second embodiment of the present invention. The packaging material, which has been given the generic reference numeral 31, has a rigid, but foldable core layer 32 of paper or paperboard, as well as outer heat-resistant layers or coatings 33 and 34, respectively, on both sides of the core layer 32.

In order to render the packaging material 31 printable so that, in a simple manner using prior art techniques and prior art equipment, it may be printed with optional decorative artwork of printing ink, the side of the core layer 32 intended for printing in the packaging material 31 according to the invention has a printable coating 35 of pigment, adhesive or binder and a substance possessing the capability of modifying the rheological properties of the coating ("rheology modifier").

In order not to conceal decorative artwork 36 of printing ink printed on the printable coating 35 of the core layer 32, the outer, heat-resistant layer or coating 34 of the packaging material 31 should be transparent so that the subjacent decorative artwork 36 will be clearly visible and apparent on visual inspection from the decorative artwork side of the packaging material 31.

Usable materials for the heat-resistant transparent coating 34 may be selected from the group essentially comprising high density polyethylene (HDPE), linear low density polyethylene (LLDPE), polypropylene (PP) and polyester (PET).

Correspondingly, usable materials for the heat-resistant outer coating 33 of the other side of the packaging material 31 may also be selected from the group essentially comprising high density polyethylene (HDPE), linear low density polyethylene (LLDPE), polypropylene (PP) and polyester (PET).

One such substance possessing the capability of modifying the rheological properties of the coating is selected according to the present invention from the group essentially comprising protein, polysaccharides, carboxy methyl cellulose (CMC), hydroxy ethyl cellulose (HEC), alkali soluble acrylic polymer emulsion (ASE), hydrophobically modified alkali soluble acrylic polymer (HASE), polyurethane (PU), polyvinyl alcohol (PVOH) and starch.

Examples of usable pigment for the printable coating 35 may be selected from the group essentially comprising layered silicate mineral, hydratised magnesium silicate, calcium carbonate, titanium dioxide and kaolin, and examples of usable adhesive or binder for the same coating may be selected from the group essentially comprising styrene butadiene latex, methyl methacrylate-butadiene latex, polyacrylate latex, styrene acrylate latex, polyvinyl acetate, polyvinyl alcohol, polysaccharides, starch, protein or optional combinations thereof.

In one specific embodiment, the printable coating may contain an adhesive or binder of a styrene acrylic copolymer in an amount of 10-20%; pigment of layered silicate mineral clay and calcium carbonate in an amount of 80-90%; and a rheology modifier in an amount of 0.1-1%, all percentage weight proportions being based on the total weight of the composition.

The packaging material 31 according to the second embodiment in FIG. 3 differs from the packaging material according to the first embodiment in FIG. 2 in that it has a layer 37 serving as gas barrier on that side of the core layer 32 which is turned to face away from the printable coating 35 of the core layer 32. On the one side, the gas barrier layer 37 is bonded to the core layer 32 by the intermediary of an interjacent layer 38 of adhesive or binder and on the other side to the heat-resistant outer coating 33 by the intermediary of a similarly interjacent layer 39 of adhesive or binder.

The layer 37 serving as gas barrier may be a barrier polymer of per se known type, such as for example ethylene vinyl alcohol copolymer (EVOH) or polyamide (PA). Preferably however, the layer 37 consists of an aluminium foil, Alifoil, which also affords the advantageous property that it renders the packaging material thermosealable by induction sealing which is a rapid, reliable and efficient sealing technology on reforming of the packaging material into retortable packages by fold forming and thermosealing.

From the packaging material according to the present invention, packages may be produced using packing and filling machines which, from a web or from prefabricated blanks of the packaging material, form, fill and seal finished packages.

From, for example, a web, packages are produced in that the web is first reformed into a tube by both longitudinal edges of the web being folded towards and united to one another in a mechanically strong sealing joint ("overlap joint"). The tube is filled with optional food and is divided into cushion-shaped packaging units by repeated transverse sealings of the tube transversely of the longitudinal direction of the tube and below the filling level of the tube. The packaging units are separated from one another by incisions in the transverse sealing zones and are given the desired geometric outer configuration, normally parallelepipedic, by an additional fold forming- and thermosealing operation.

Correspondingly, packages are produced from flat-folded tubular blanks of the packaging material. The flat-folded blank is raised to an open packaging carton whose one end (e.g. bottom end) is sealed by fold forming and thermosealing of the foldable bottom panels of the packaging carton. The packaging carton provided with a bottom is filled with optional food, whereafter the open end of the packaging carton (in this example the top end) is sealed by fold forming and thermosealing of the corresponding foldable top panels of the packaging carton.

INDUSTRIAL APPLICABILITY

A packaging material according to the present invention is intended for the production of retortable packages by fold forming and thermosealing of the packaging material. The packaging material is particularly intended for such packages for foods such as vegetables, pastes, soups, fish, soups etc. Dog and cat food are also intended to be packed and stored in such retortable packages Many modifications are conceivable without departing from the spirit and scope of the appended Claims.

What is claimed is:

1. A packaging material for a package of the type which is produced by fold forming and thermosealing and which, after filling and sealing is, for purposes of extending shelf-life, intended to be subjected to a heat treatment at elevated temperature and high relative humidity, the packaging material including a layer of paper whose one surface has a printable coating of pigment and adhesive or binder and decorative artwork of printing ink applied on the printable coating, as well as a recurring pattern of crease lines in register with said decorative artwork of printing ink, the printable coating also including a substance possessing the capability of modifying the rheological properties of the printable coating, wherein the composition of the printable coating includes an adhesive of a styrene acrylic copolymer in a quantity of 10-20% of the weight of the composition, pigment consisting of layered silicate mineral clay and calcium carbonate in an amount of 80-90% of the weight of the composition, and the substance possessing the capability of modifying the rheological properties of the printable coating being an acrylic copolymer in an amount of 0.1-1% of the weight of the composition.

2. The packaging material as claimed in claim 1, further including aluminium foil serving as a gas barrier.

3. The packaging material as claimed in claim 1, further comprising outer, heat-resistant coatings of plastic.

4. The packaging material as claimed in claim 3, further comprising an aluminium foil serving as gas barrier, the aluminium foil being positioned on one of the sides of the layer of paper, one of the outer, heat-resistant coatings being located on the one of the sides of the layer of paper, and the aluminium foil being located between the layer of paper and the one of the outer, heat-resistant coatings that is on the one of the sides of the layer of paper.

5. A retortable package which is produced by fold forming and thermosealing of a packaging material according to claim 1 which is provided with decorative artwork and crease lines.

* * * * *